Figure 3:
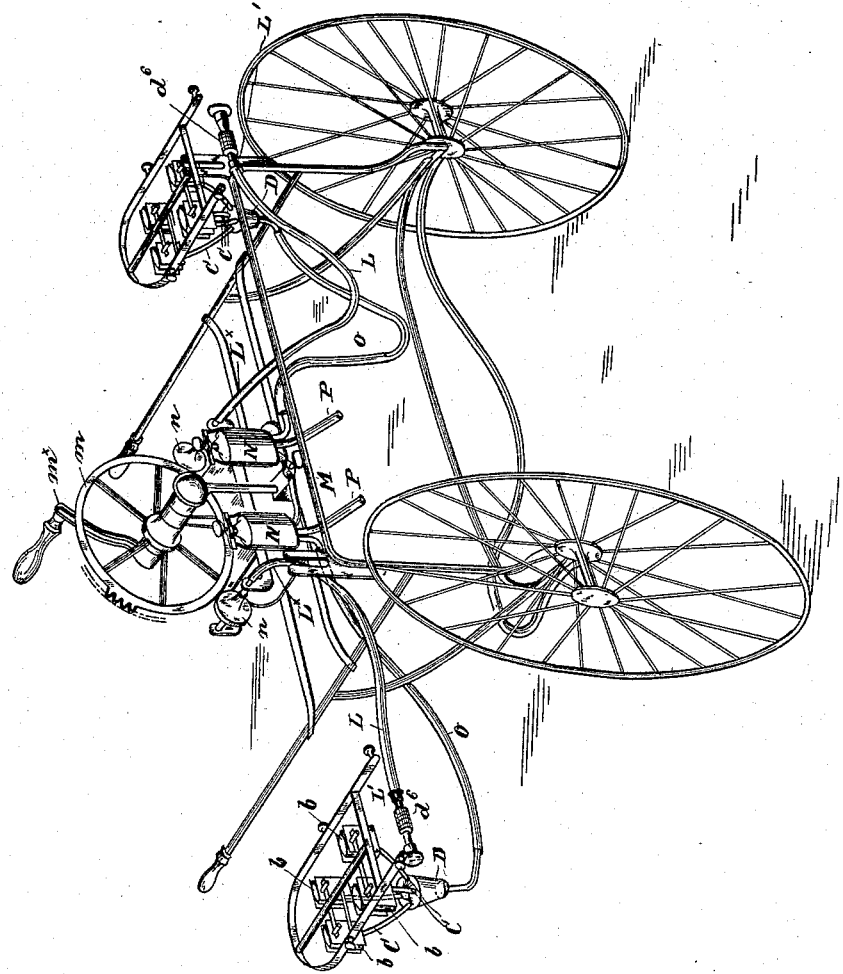

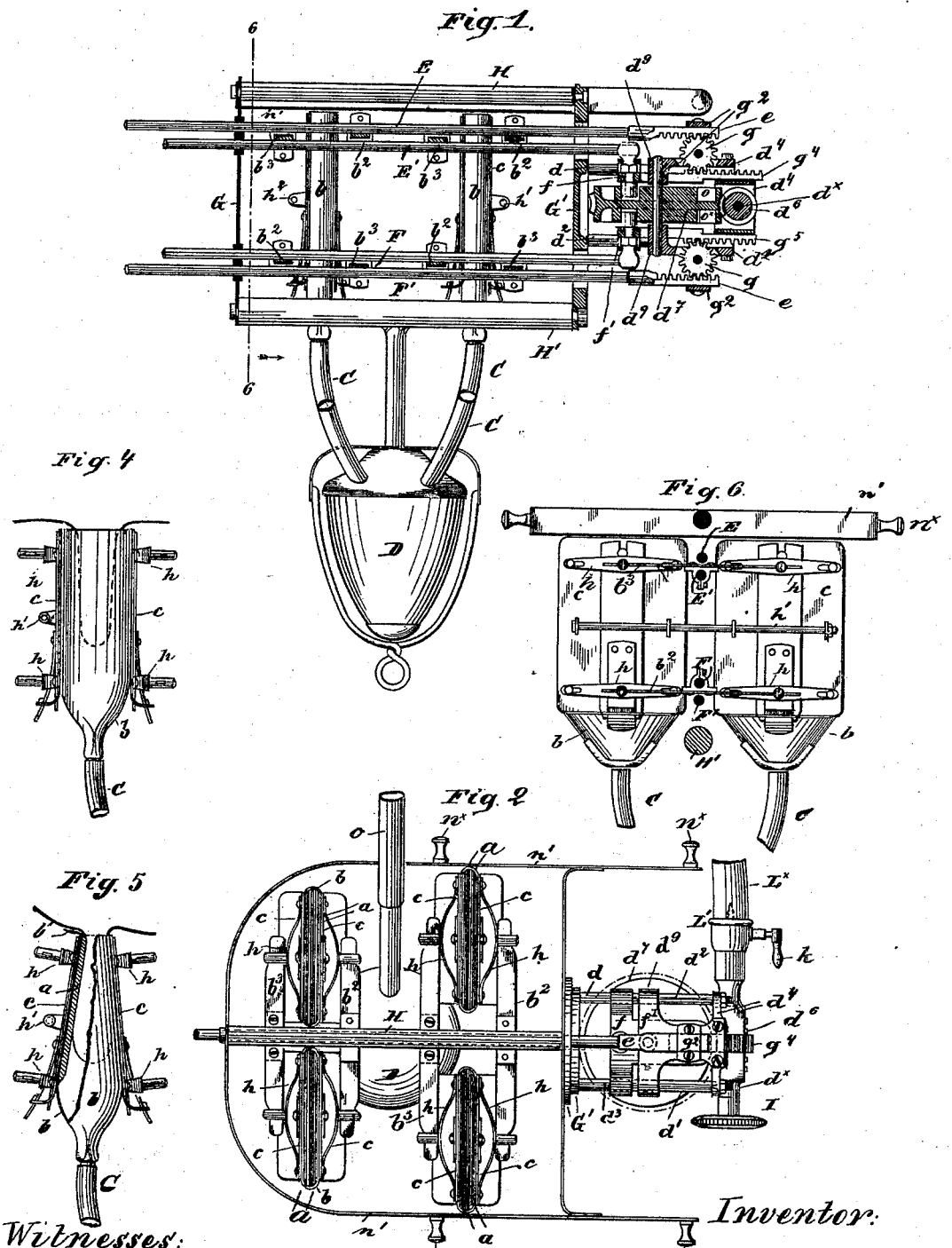

(No Model.) 3 Sheets—Sheet 2.
C. F. KASTENGREN.
COW MILKER.

No. 500,713. Patented July 4, 1893.

Witnesses:

Inventor:
Carl F. Kastengren.
by Henry Connett
Attorney (No Model.) 3 Sheets—Sheet 3.
C. F. KASTENGREN.
COW MILKER.
No. 500,713. Patented July 4, 1893.
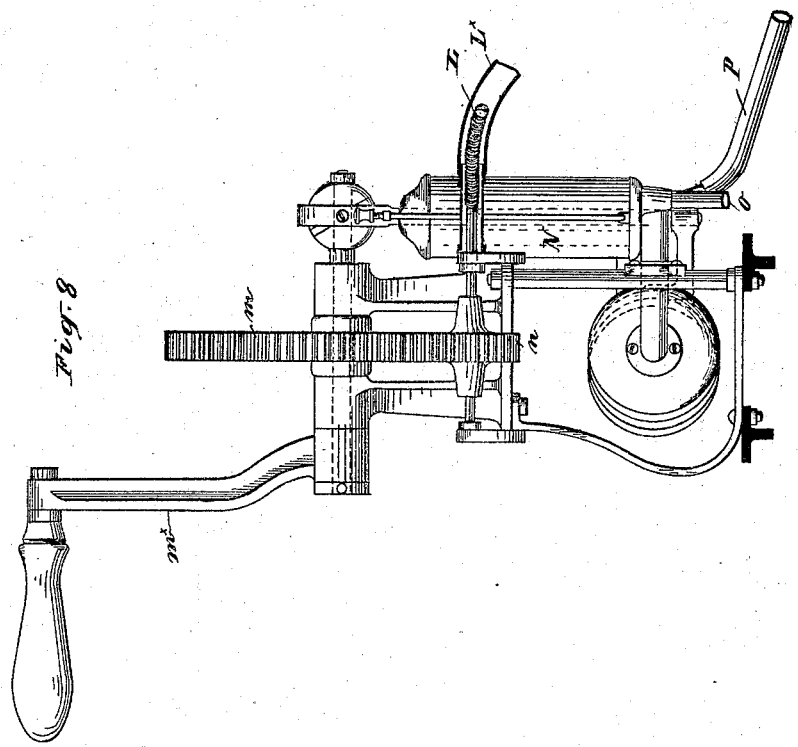
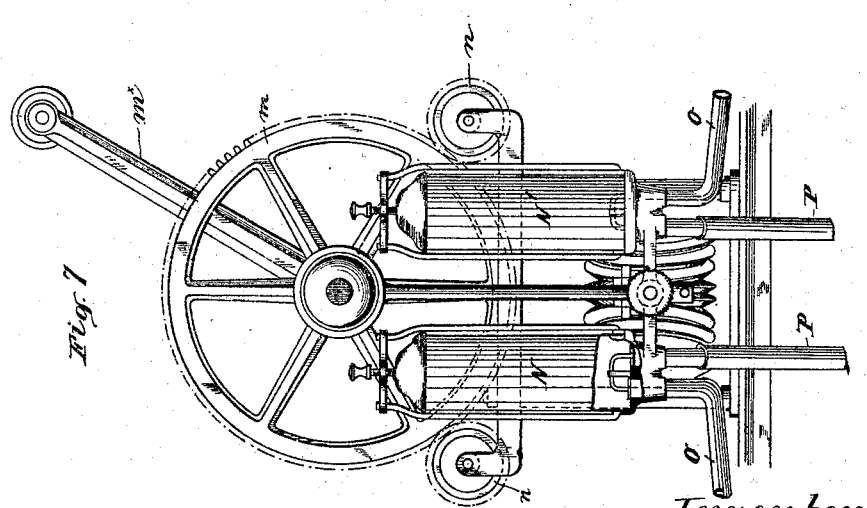
Witnesses:
Inventor:
Carl F. Kastengren
by Henry Connett
Attorney

UNITED STATES PATENT OFFICE.

CARL FREDRIK KASTENGREN, OF SJOGERAS, KLEFVA, SWEDEN.

COW-MILKER.

SPECIFICATION forming part of Letters Patent No. 500,713, dated July 4, 1893.

Application filed February 20, 1892. Serial No. 422,186. (No model.) Patented in Sweden November 10, 1891, No. 8,714; in France March 12, 1892, No. 220,100; in Belgium March 15, 1892, No. 98,846; in Norway March 15, 1892, No. 2,672; in England March 22, 1892, No. 5,650; in Switzerland June 1, 1892, No. 5,479; in Italy June 30, 1892, XXVI, 32,178, and LXIII, 175; in Spain July 11, 1892, No. 13,424, and in Austria-Hungary October 21, 1892, No. 12,751 and No. 32,221.

*To all whom it may concern:*

Be it known that I, CARL FREDRIK KASTENGREN, a subject of the King of Sweden and Norway, residing at Sjogeras, Klefva, Sweden, have invented certain Improvements in Cow-Milkers, (for which patents have been granted in Sweden, No. 8,774, dated November 10, 1891; in Belgium, No. 98,846, dated March 15, 1892; in France, No. 220,100, dated March 12, 1892; in Italy, Vols. XXVI and LXIII, Nos. 32,178 and 175, dated June 30, 1892; in Spain, Liber 15, folio 335, No. 13,424, dated July 11, 1892; in Norway, No. 2,672, dated March 15, 1892; in England, No. 5,650, dated March 22, 1892; in Switzerland, No. 5,479, dated June 1, 1892, and in Austria-Hungary, No. 12,751 and No. 32,221, dated October 21, 1892,) of which the following is a specification.

My invention relates to that class of devices commonly termed "cow milkers," which are designed to perform mechanically the milking of cows, and the object of my invention is to provide a device of this general character whereby the milking may be accomplished in a more rapid manner than by hand and whereby one or several cows may be conveniently milked at one time and by the same machine.

In carrying out my invention, I employ two forces, suction and compression, acting alternately, suction being employed for the purpose of drawing the milk from the bag down into the teat or dug, and pressure being employed to force the milk from the teat out into the receptacle provided therefor; and in order that the device may resemble in its operation, as nearly as possible, the movements of the fingers in milking by hand, I prefer to effect the pressure gradually downward, commencing at the base of the teat, whereby all of the milk therein is forced out into the receptacle below and not back into the bag.

My invention will be fully described hereinafter and its novel features carefully defined in the claims.

In order that my invention may be the better understood, I have illustrated in the accompanying drawings a cow-milker or milking apparatus embodying my improvements, and adapted for milking two cows at the same time.

In the drawings—Figure 1 is a vertical, longitudinal section of the milker proper, detached from its supporting frame or carriage and Fig. 2 is a plan of same. Fig. 3 is a general perspective view, on a small scale, showing the device as a whole, some of the details of the milker proper being, however, omitted to avoid confusion. Figs. 4 and 5 are detail views, on the same scale as Figs. 1 and 2, showing the cup for receiving the teat in two positions. Fig. 6 is a section, taken along the line 6, 6, in Fig. 1, showing details of construction. Figs. 7 and 8 are respectively, a side and face view of the air-exhauster and device for communicating motion to the milking devices, which will be explained hereinafter.

Referring, primarily to Figs. 1, 2, 4, 5 and 6, $b$, $b$, are oblong rubber cups, four in number, which are mounted within the frame of the milking device proper, each in position to receive one of the four teats. Within the cups $b$, on opposite sides thereof, are fixed plates $a$, $a$, of metal or the like, secured, as seen in Fig. 5, by means of screws or rivets, to other metal plates $c$, on the outside of said cups $b$. These cups $b$ are tied or connected together in pairs by light tie-rods $h'$, secured to the plates $c$, and said plates $c$ are connected by means of light curved springs, $h$, to crossheads $b^2$, $b^3$, on opposite sides, respectively, of the pairs of cups $b$, there being four springs and cross-heads for each of said cups, one pair at the top and one at the bottom thereof, as clearly seen.

Each of the upper pairs of cross-heads $b^2$, $b^3$, is connected with one of two slide-rods, E, E', mounted to slide longitudinally in bearings in the end frames G, G', of the device, as seen in Fig. 1, and in like manner, each of the lower pair of cross-heads $b^2$, $b^3$ is connected, respectively, with one of two slide-rods F, F', also mounted to slide in bearings in said end frames. Thus it will be seen that by sliding the rods E, E', endwise in opposite directions, the cups $b$ will be closed or forced together at their mouths, taking the form seen in Figs. 5 and 2, and by sliding rods F, F', endwise in opposite directions, said cups will be forced together at their lower ends, taking the form seen in Fig. 1, in side elevation. By sliding or drawing said rods in the opposite directions, said cups will, of course, be again distended or opened from top to bottom as seen in Fig. 4.

I will now proceed to describe the means for actuating the slide rods E, E', F, F', whereby the cups are opened and closed reference being had to Figs. 3, 7 and 8 for illustration.

$m$ is a large gear wheel mounted in bearings on the frame of the carriage as seen in Fig. 8, and provided with a crank $m^\times$, on one end of its shaft, whereby it may be rotated by hand.

$n$, is a pinion, mounted rotatively in the frame of the carriage, its teeth engaging with those of the gear wheel $m$. Fixed to the end of the shaft of the pinion $n$, is a long coil spring L, inclosed in a flexible rubber or other tube, $L^\times$, in a well known way, whereby the rotary motion of said shaft is communicated to a shaft $d^\times$, mounted in bearings in a projecting bridge $d^4$, which is secured by means of four tie-bars $d$, with the end frame G', of the milking device proper.

Secured to shaft $d^\times$ is a screw or worm $d^6$, which meshes with a worm wheel $d^7$, mounted to rotate in bearings in arms $d^9$, $d^9$, projecting from the bridge $d^4$, as seen in Figs. 1 and 2. In the upper and lower faces of the worm wheel $d^7$, are cam grooves $o$, $o^\times$, with which engage pins or rollers mounted on the inner faces of yokes $f$, $f'$, guided on the tie-rods $d$, as seen in Fig. 2, and to these yokes are coupled the respective slide-rods E', F. Thus it will be seen that rotary motion communicated from the crank $m^\times$ through the spring L, rotating the worm $d^6$, rotates the worm wheel $d^7$, and through the medium of the cam grooves in the respective faces thereof engaged by the pins on the ends of the slide-rods, said rods are reciprocated, moving the cross-heads $b^3$ with them. In order that the rods E, F' may partake of the same movement as rods E', F, but in an opposite direction, I form on the end of each of said rods E, F', a rack $e$, which engages a pinion $g$, mounted in a projecting hood $g^2$, projecting from the upper and lower faces respectively of frame $d^4$. These pinions $g$ engage respectively, toothed racks $g^4$, $g^5$, on the end of fingers projecting from the yokes $f$, $f'$. By this arrangement the movement of rods E', F and the racks $g^4$, $g^5$ on the yokes thereof in one direction, acting through the pinions, moves the rods E, F' in an opposite direction, so that said rods acting simultaneously on tubes $b$ from opposite sides, close said tubes evenly.

In order that the cups $b$ may be closed or forced into a flattened form gradually, commencing at the top, I set the cam groove $o$ in the upper face of wheel $d^7$ which operates the upper slide rods, to act in advance of the cam groove $o^\times$ in the under side of said wheel, as will be readily understood. By varying the form of said cam grooves, various other differences may be had in the movements of the slide-rods.

I will now describe the device for exhausting the air from the cups $b$.

N, N', (Fig. 7) are the chambers of an air pump of ordinary construction, from which lead flexible or other tubes O, P, provided with suitable valves controlling their openings into said pump chambers. The tubes O, O, each lead as seen in Fig. 3, to the bottom of a reservoir or chamber D hung, by means of tubes C, C, four in number, from the under side of cups $b$, one of such reservoirs being hung below each group of four cups in the device. The tubes P, P, discharge from the chambers of the pump, to a receiving pail or receptacle, placed beneath. Between the shaft of gear wheel $m$ and the air-pump chambers suitable intermediate mechanism is employed for effecting the aspiration of air from said chambers when the crank $m^\times$ is turned; but this mechanism may be of any well known kind. Now it will be seen that when the crank $m^\times$ is turned, the air is forced from the cylinders of the pump, drawing the air or milk, as the case may be, from the tubes O, into said chambers N, N', to take the place thereof. Thus a suction is put upon the cups $b$, $b$, drawing the milk from the teats held therein. The pump is so arranged by preference, as to act upon the cups $b$, when the same are distended as seen in Fig. 4, and the several compressing devices combined in the same apparatus will be timed in their action to co-operate with the respective chambers of the pump with which each is connected.

It will be observed that the springs $h$, interposed between the positively actuated slide rods and the plates $c$ on cups $b$, prevent said plates from pressing or pinching too forcibly on the teats therein. These springs may be arranged in any known way so long as they effect the end sought.

I do not wish to limit myself to the precise construction and arrangement of the mechanism shown for compressing the cups $b$, as this may be varied somewhat without materially departing from my invention.

I am aware that it is not new in milking machines to employ an arrangement of mechanism for pressing the teats only and which thus presses the milk out of the teat, and I am also aware that pumps have been used in milking machines or devices, and therefore I do not claim such constructions broadly and alone.

Having thus described my invention, I claim—

1. A cow-milking apparatus comprising as its essentials, mechanism substantially as described for compressing the teat, and mechanism substantially as described for sucking out the milk thus pressed from the teat, said mechanisms being adapted and arranged for alternate operation, as set forth.

2. In a cow-milking apparatus, the combination with a cup adapted to receive the teat, mechanism substantially as described for alternately compressing said cup gradually from its mouth to the base thereof and then expanding it, and an intermittently acting suction pump communicating with the base of said cup, the compression of the cup and the suction operation of the pump being effected alternately, as set forth.

3. In a cow-milking apparatus, the combination with the cup adapted to receive the teats, of the slide rods E', F, secured to one side thereof, respectively at top and bottom, the wheel $d^7$, bearing cam-grooves in its opposite faces adapted to receive pins on the ends of said slide rods, and means, substantially as described, for rotating said wheel $d^7$, whereby said rods are reciprocated, the slide rods E, F', secured respectively to the side of cup $b$, opposite rods E', F, and mechanism, substantially as described for communicating the movement of rods E', F, to said rods E, F', whereby said cups are forced together at opposite sides, substantially as and for the purposes set forth.

4. In a cow-milking apparatus, the combination with the cup adapted to receive the teat, of the slide rods E', F, secured to one side thereof, respectively at top and bottom, the wheel $d^7$, bearing cam-grooves in its opposite faces, adapted to receive pins on the ends of said slide rods, means, substantially as described for rotating said wheel $d^7$, whereby said rods are reciprocated, the racks secured to the ends of said slide rods, the slide rods E, F', secured respectively to the sides of cup $b$, opposite rods E', F, the racks on the ends of said rods E, F', and the pinions $g$ meshing with said racks on the ends of said slide rods, whereby said cups are forced together at opposite sides, substantially as and for the purposes set forth.

5. In a cow-milking apparatus, the combination with the cup $b$, adapted to receive the teat, of mechanism, substantially as described, for compressing said cup gradually from its mouth to the base thereof, the air-pump, mounted on the frame of the apparatus, the tube O, and its valve, said tube connecting one chamber of said pump to the base of the cup $b$, whereby said pump draws the milk and air from said cup $b$, after each compression of the latter, as set forth.

In witness whereof I have hereunto signed my name in the presence of two subscribing witnesses.

CARL FREDRIK KASTENGREN.

Witnesses:
ERNST SVANQVIST,
C. W. ERDMAN.